(No Model.)

J. T. MOSELY.
FELLY FOR WHEELS.

No. 521,385. Patented June 12, 1894.

Witnesses;
J. Coleman
W. H. Klim

Inventor:
Jeremiah T. Mosely
By S. C. Fitzgerald
Atty.

THE NATIONAL LITHOGRAPHING COMPANY,
WASHINGTON, D. C.

UNITED STATES PATENT OFFICE.

JEREMIAH THOMAS MOSELY, OF SHELBYVILLE, TEXAS.

FELLY FOR WHEELS.

SPECIFICATION forming part of Letters Patent No. 521,385, dated June 12, 1894.

Application filed January 12, 1894. Serial No. 496,690. (No model.)

*To all whom it may concern:*

Be it known that I, JEREMIAH THOMAS MOSELY, a citizen of the United States, residing at Shelbyville, in the county of Shelby and State of Texas, have invented certain new and useful Improvements in Fellies for Wheels; and I do hereby declare the following to be a full, clear, and exact description of the invention, such as will enable others skilled in the art to which it appertains to make and use the same.

My invention relates to an improvement in fellies for wheels, and particularly for heavy wagon or cultivator wheels.

The invention will first be described in connection with the accompanying drawings, and then particularly pointed out in the claim.

Figure 1:
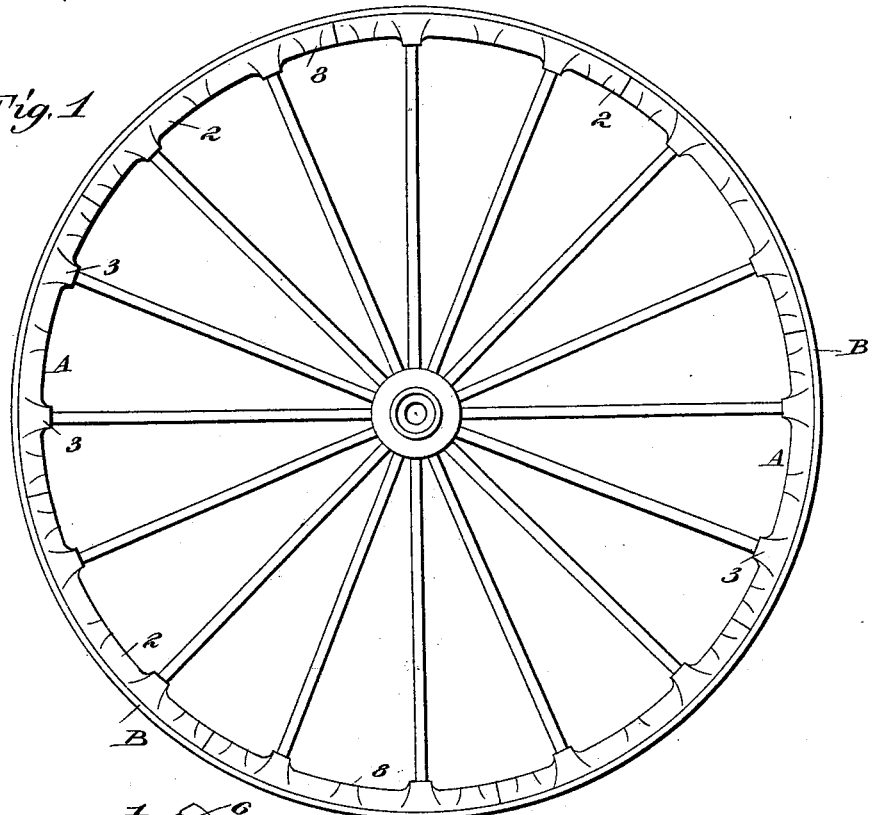
Figure 2:
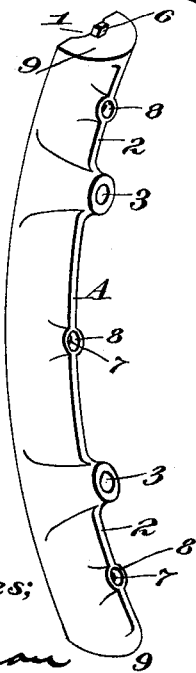
Figure 3:
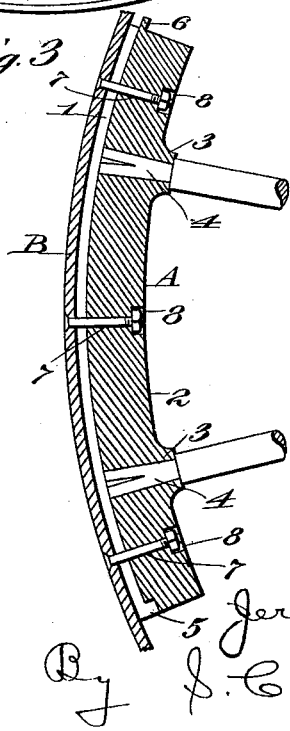
Figure 4:
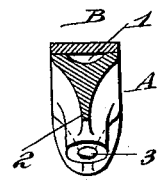
Figure 5:
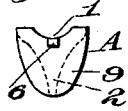

In the drawings—Figure is a side elevation of a complete wheel provided with a rim, embodying my invention. Fig. 2 is a perspective view of one of the fellies. Fig. 3 is a longitudinal sectional view of the same. Fig. 4 is a transverse section of the same. Fig. 5 is an end view of one of the felly sections.

Referring to the drawings, A is a felly made of malleable iron and having a channel 1 in its back, the inside edge 2 of the felly being thinner than the back.

In order that the spokes may be properly held to the rim of the wheel each felly is provided with a plurality of spoke-sockets, 3, as shown, which are tapered being larger in their inside diameters at the outside than at the inside. Into the sockets the spoke tenons, 4, are inserted and then secured by wedging in the usual way.

One end of each felly is provided with a dowel-mortise or recess, 5, while the opposite end of the same felly is provided with a dowel-pin 6, cast integral with the felly the dowel-pin of each felly being arranged to enter the dowel-mortise in the next adjacent felly when the fellies are all placed together to form a rim.

The tire B is shrunk or similarly placed upon the rim, in the usual way, and as the fellies are channeled in their backs, at 1, as before described, it will be plain that the ends of the spoke-tenons, which are flush with the bottom of the channel, will not rest upon the inner face of the tire and consequently will not be continually hammered by the blows received on the tire when the wheel is in use.

For the purpose of securing the fellies to the tire the fellies are each provided with three bolt holes, 7, one at each end and one in the center, and the inside edge of each felly is provided with nut sockets 8 so that when the bolts are placed through the tire and fellies they may be secured by nuts which, being located in the nut-sockets, are protected from the wear due to mud, sand, &c., through which the rim passes.

It will be observed that each spoke-socket has a depth greater than that of the felly, and that the ends of the fellies are widened, as shown at 9. The object of this is to prevent the breaking of the fellies through the spoke-sockets or near the joint, a breakage very common in those malleable fellies with which I am acquainted. Moreover, by making the ends of each felly wider than elsewhere a broader bearing is given for the distribution of the strain from one felly to another. As the dowel-pins are cast integral with the fellies it becomes possible to make a joint between the fellies, which will permit enough play to allow for expansion and contraction of the metal, the dowel-pin moving longitudinally in the dowel-mortise.

Having thus fully described my invention, what I claim as new, and desire to secure by Letters Patent, is—

A felly for wheels, made of malleable iron and having its inside edge narrower than its peripheral surface, and provided with a central channel extending longitudinally of said peripheral surface, said felly being provided with conical spoke sockets, the larger ends of which are directed outwardly and open into the base of said channel, the inner smaller ends of said sockets being surrounded by the projecting flanges 3 of greater width than the narrow inside edge of the felly, substantially as and for the purpose set forth.

In testimony whereof I affix my signature in presence of two witnesses.

JEREMIAH THOMAS MOSELY.

Witnesses:
C. P. SMITH,
R. M. BIGGAR.